Sept. 13, 1960 C. WEBER 2,952,281

PORTABLE UNDERCUTTING AND ROUTING DEVICE

Filed Nov. 7, 1958 5 Sheets-Sheet 1

INVENTOR
Carl Weber
BY John F Brezina
ATTORNEY

INVENTOR
Carl Weber
BY John F Brezina
ATTORNEY

Sept. 13, 1960 C. WEBER 2,952,281

PORTABLE UNDERCUTTING AND ROUTING DEVICE

Filed Nov. 7, 1958 5 Sheets-Sheet 3

INVENTOR
Carl Weber

BY John F. Brezina
ATTORNEY

Sept. 13, 1960 C. WEBER 2,952,281

PORTABLE UNDERCUTTING AND ROUTING DEVICE

Filed Nov. 7, 1958 5 Sheets-Sheet 4

INVENTOR
Carl Weber

BY John F. Brezina
ATTORNEY

PORTABLE UNDERCUTTING AND ROUTING DEVICE

Filed Nov. 7, 1958 5 Sheets-Sheet 5

INVENTOR
Carl Weber
BY John F Brezina
ATTORNEY

United States Patent Office 2,952,281
Patented Sept. 13, 1960

2,952,281

PORTABLE UNDERCUTTING AND ROUTING DEVICE

Carl Weber, 1201 Lowe St., Algonquin, Ill.

Filed Nov. 7, 1958, Ser. No. 772,583
16 Claims. (Cl. 144—136)

This invention is directed to novel machines for cutting, sawing and routing relatively hard materials including wood, plastics, hard putty and other relatively hard mastic and cementitious materials.

Objects and accomplishments of my invention are (*a*) to provide a portable adjustable machine for cutting, routing and removing hard putties and other cementitious materials and which have manually adjustable gauge means for limiting the depth of cutting; which have novel manually adjustable means for controlling the width of cutting and routing and which have novel guide means for guiding the driven cutting and routing elements relative to structural members such as sash or window rails or the like.

In the trades of installing various floor coverings, i.e. tile, parquet panels, carpeting, linoleum, and in the trades directed to building and installation of counter tops, sinks, sink frames, work table tops, and the like which are of plastic, wood or other hard composition materials, it is frequently necessary to undercut the adjacent wall to provide elongated grooves or recesses in the walls adjacent to the floor or the framing and supports for the work bases. There is no portable power driven saw available or previously manufactured which can be used for this purpose as conventional portable saws have substantially large parts of the frames and housings projecting in all directions from the rotating saw blade and which prevent the blade from being used relatively close to floors or work bases for undercutting purposes. It is a known fact that it is impossible to use any type of power saw now known for such purpose, and the result has been that workmen have usually tried to do such close undercutting with a hand saw which has been extremely difficult and in most instances impossible because there is no place to reciprocate the saw in the wall or adjacent structural member.

Most efforts to undercut baseboards with hand saws next to floors have been very difficult and often impossible, and the difficult manual reciprocation of a saw even in limited instances results in uneven cutting and unsightly recesses of varying uneven widths.

My power driven sawing and cutting device herein described provides a machine having a driven saw blade mounted on the extreme end of a driven shaft and adjustable guide means which maintain the saw at varying distances from the floor or base support during the cutting operation so that relatively narrow or relatively wide grooves or recesses will be formed by removal of cut-away strip of the angularly extending wall portions, re baseboards, back-boards, etc. The forming of such grooves by undercutting permits the workmen to insert edge portions of tile, floor covering, counter and work tops into such grooves so that such edges of the covering material will be concealed and not visible and no undesirable cracks will be exposed to view.

A further advantage of such mounting of the covering edges is that when the last row of tile adjacent the wall is laid, the same do not have to be cut off in many instances to fit the narrower remaining spaces between the wall and the previously laid row of tile.

It is accordingly one of the further objects and accomplishments of my invention to provide a portable adjustable saw or cutter which has novel structural features providing for undercutting walls and wall portions substantially adjacent to floors and adjacent other obstructions adjacent to which it is necessary to cut away parts of adjacent angularly extending walls or parts of structural members, and which have manually adjustable guides and gauges which are adapted to engage either the floor or adjacent structural members.

A further advantage of my said portable machine is that it has manually adjustable means for limiting the depth of undercutting angularly extending walls or members and novel adjustable means for cutting into corners of rooms so that two walls or two wall portions (such as baseboards) are undercut simultaneously to the desired depth and in the desired selected width and desired distance from a floor or other horizontal support.

An important further unsolved problem which is solved and accomplished by my invention has been and is the problem of removing either hard putty or other similar relatively hard originally mastic material from window sashes. Such removal is necessary either when it is necessary to replace glass panes or when the old putties deteriorate and crack so as to admit moisture into the sash and admit cold air, etc. One of the difficulties of said problem has been the avoiding of cutting away and damage to the sash during such putty removal which damage is usually unavoidable when the present hand and chisel method of putty removal is employed.

An important part of this problem is the proper and accurate removal of hard putty where no glass breakage has occurred and where the weather-damaged and insecure hard putty has to be removed from the sash and replaced, and no satisfactory tool for economically accomplishing this problem has been devised or marketed prior to the production of this invention, which accomplishes the constant and correct limitation of the depth of cutting of the rotating cutter and also the adjustable and correct limitation of the width of cutting as the tool engages a line of hard putty. This difficulty has been enhanced by the fact that the pane of glass, when mounted makes very difficult the proper guiding of the cutting unit and its limitation of depth of cut.

This said unsolved problem has been further enhanced by the fact that the lines of hard putty are of different width on different sizes of sash, and are also of different depth, and by the further fact that in most instances the workman has to be supported on a ladder or the like outside of the window pane in which position it is usually impossible to properly move and guide the free-moving cutter tool along both the left and right vertical lines and along both the lower and upper horizontal lines of the sash or frame. The normal position of the workman supported on a ladder does not permit him to hold any known rodding tools correctly in relation to the left and right hand sash rails and in relation to the upper and lower rails of the sash, it being borne in mind that he must hold the power driven unit, usually an electric motor, freely moving in his hands during such operation. This difficult problem is further aggravated by the fact that the substantially adjacent outward projecting portion of the window frame is so close to the vertical side rails of a slidable modern sash that properly controlled and guided movement of the driven cutter has been impossible.

It is therefore one of the further important objects and accomplishments of my invention to provide novel power driven tools for a rotating cutter and adapted for removal of hard putty and other mastic material from mounted sash so as to correctly and completely remove the hard putty from such sash without damage to the mounted glass panes and the sash frame, and which power driven cutting tools have one or more manually adjustable depth gauges and an additional adjustable gauge for controlling the width of cutting, and wherein said gauges are adapted to slidably engage parts of the respective sash rails and at the same time permitting the driven tool and its power unit to be maintained inwardly of such rails with ample clearance for successful stroke movements.

A further object and accomplishment of my invention is the provision of a novel power driven cutting and routing tool of the described class which includes a manually adjustable swingable handle and also means for release of the securing of the same at different angular positions in relation to the head carrying the cutting element and in relation to the different rails of the sash and frame, the aforesaid permitting the user to selectively position said adjustable handle and the cutter carrying head and attached parts for proper and satisfactory operation.

A further object and accomplishment of my invention is the provision of a portable cutting and routing tool of the class described having a manually adjustable gauge and a shoe for limiting the depth of cutting and routing with respect to sash rails or the like, and also to provide a manually adjustable gauge for varying the width of cutting to be performed to thereby prevent damage and cutting away of edge and ridge portions of the sash.

A further object and accomplishment of my invention is the provision of a portable power driven tool having an adjustable chuck in which the cutting element mounted on different shafts or spindles may be alternately and easily mounted for operative engagement with said chuck, said cutting elements being selectively either a single blade with a plurality of teeth or a plurality of radially extending cutters.

It is a further accomplishment to provide a portable cutting machine for cutting and sawing which has novel structural features permitting it to be compactly mounted in a portable box in such a way that the adjustable table will be mounted about the edges of the box, and which has a manually adjustable guide and fence extendable upon one edge and wall of the box so as to permit selective guiding of relatively long pieces of hard material along the upwardly extending fence and in engagement with the driven saw blade, said novel structural features for mounting said machine in said box including a removable mounted cradle for supporting the prime mover and the driven and other parts of the machine.

Figure 1:
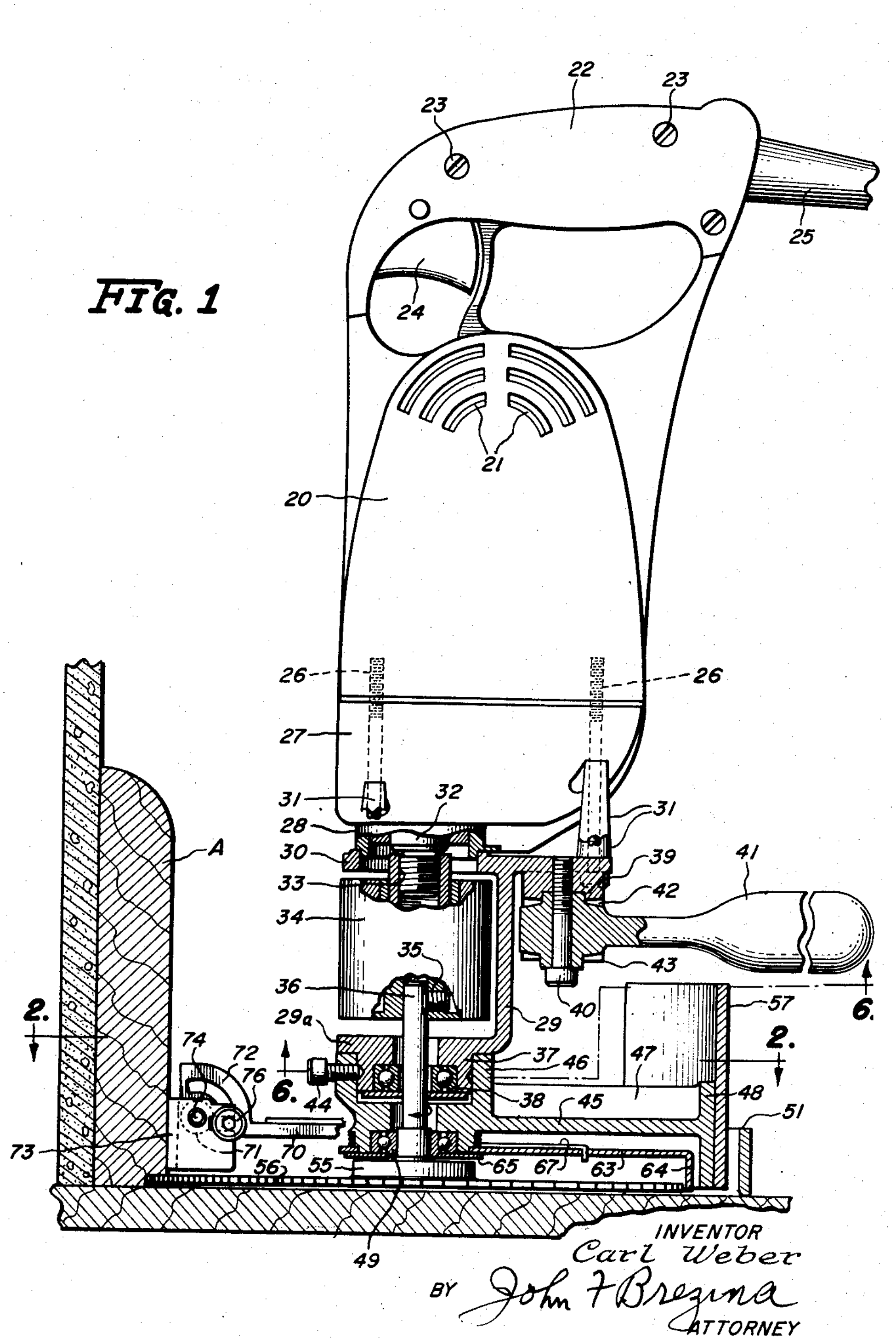
Fig. 1 is a side elevational view of one embodiment of my portable sawing and cutting machine and showing certain parts in cross section, and illustrating one typical position of a blade in relation to a typical floor and baseboard which is to be undercut.

Numeral 20 designates an elongated metal housing or casing which is preferably formed of two joined hollow sections which form a chamber in which a suitable electric motor (not shown) is suitable mounted. Said housing has a plurality of slots or vents 21 near one end thereof to permit exit of heat and has a hollow handle section designated as 22 which is composed of two interfitting sections secured together by screws 23, and suitably connected to housing 20. Said handle section houses a suitable electric switch (not shown) which is operated by a spring pressed trigger 24, and said handle also encloses portions of conventional circuit wires (not shown) which extend outwardly through a tapered bushing 25.

The opposite edge of housing 20 is flat and contains four spaced apart threaded passages in its wall. A passaged metal cap 27 of rounded form is secured by four screws 26 which extend through holes in said cap and thread in the threaded passages of housing 20, as illustrated in dotted lines in Figs. 1 and 7, and more fully hereinafter described.

Within cap 27 is mounted a pair of reduction gears which compose a conventional speed reducer (not shown) one of which is driven by the motor armature shaft.

Figures 6, 7, 8, 9, 10:
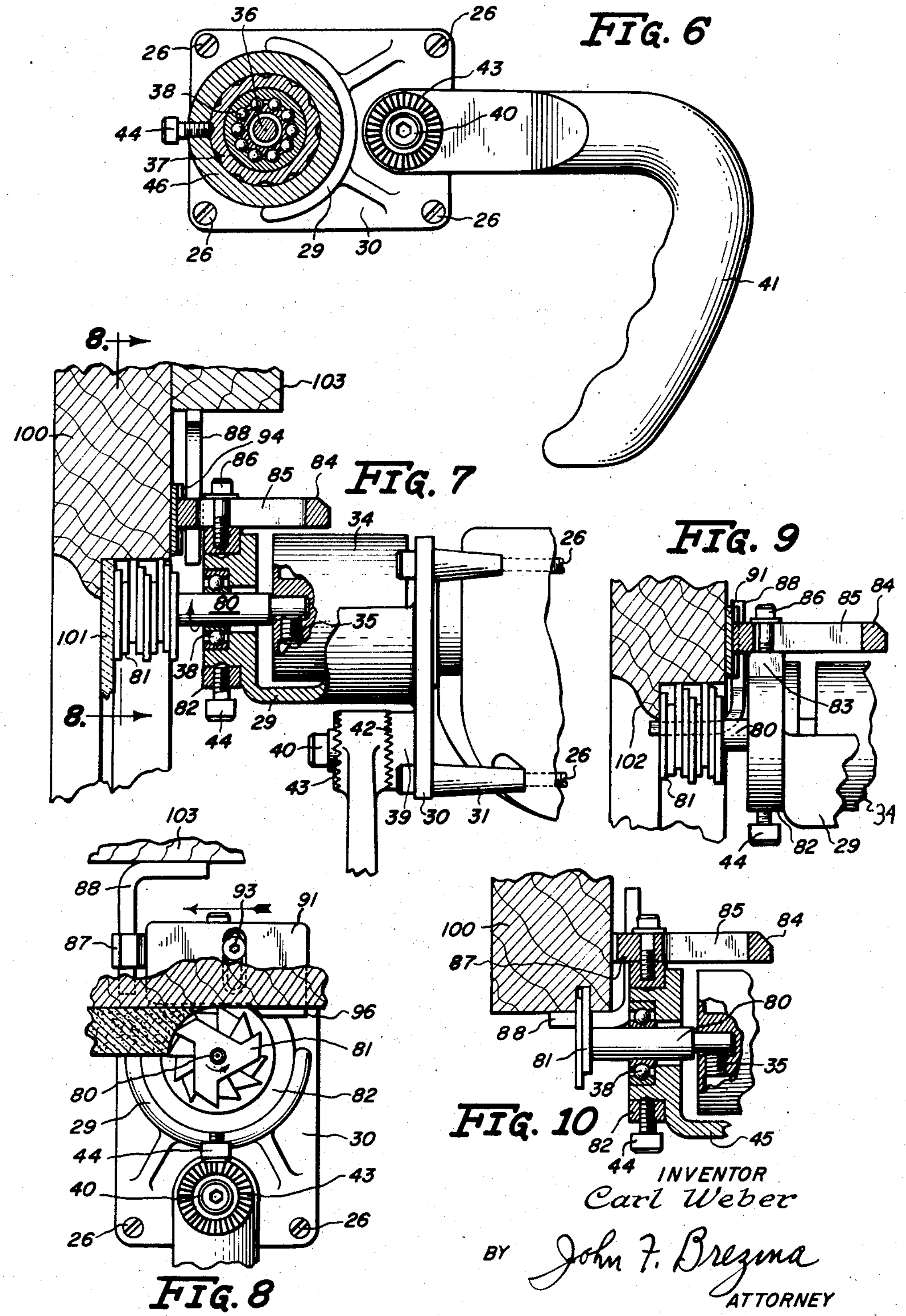
Fig. 6 is an enlarged cross section view taken on the irregular line 6—6 of Fig. 1 and looking upwardly.
Fig. 7 is an enlarged elevational view of the head portion of my device, with a portion of the motor house broken away, and illustrating a spindle and plurality of cutters thereon in relation to sash, frame and window pane mounted therein.
Fig. 8 is a cross section view taken substantially on line 8—8 of Fig. 7.
Fig. 9 is an enlarged partially cross section view of a portion of the head with spindle and cutters thereon and with the width-of-cut gauge in relation to a rail of a window sash.
Fig. 10 is an enlarged cross section view of the axle or spindle with two radical cutters mounted thereon in operative position in relation to an upper sash rail which has a U shaped groove therein.

Housing cap 27 carries a metal ring 28 on its outer face which has an annular recess and shoulder as illustrated in Fig. 1. A bracket like metal mounting and journalling member 29 has an integral passaged and apertured mounting plate 30 which has an integral flange which seats in the recess of ring 28, and has a plurality of passages, preferably four, formed therein adjacent its corner portions, as indicated in Figs. 1, 7, and 8.

A plurality of screws 26 extend through the apertures of said plate 30 and through metal sleeve-like spacers 31 through correspondingly spaced passages in cap 27, and said screws thread into the threaded passages of the wall of housing 20 to thereby securely connect said cap and said housing, and mount said mounting member 29 in projecting position as illustrated.

As illustrated in Fig. 1 the outer end portion of driven shaft 32 is illustrated, the same being driven through a speed reducer (not shown) in cap 27 and shaft 32 is externally threaded as at 33 to provide for the removably threaded mounting of a chuck 34.

Chuck 34 is centrally passaged and threaded as indicated and has a threaded radial passage adjacent one end thereof in which is mounted a threaded screw 35 which is adapted to be tightened inwardly to releasably hold a shaft or spindle 36, as illustrated in Fig. 1, on which the work element is mounted.

The lower journalling portion 29*a* of the mounting member 29 is centrally passaged and connected by the intermediate integral leg to the mounting plate 30. Said journalling portion 29A of member 29 carries integral hub 37 to provide for mounting of a radially extending mounting frame hereinafter described. Said hub 37 is internally recessed and has a ball bearing 38 mounted therein for a purpose hereinafter described.

As illustrated in Figs. 1 and 7, the mounting plate 30 has an integral normally depending toothed boss 39 and has a threaded hole therethrough in which is releasably and adjustably mounted a screw 40 which extends through a passage in one end portion of the angular portion of the metal handle 41 (see Figs. 1, 6, and 7).

The inner end portion of the handle 41 has a series of teeth 42 formed therein on one angular face thereof, and has a plurality of teeth 43 formed in the opposite face thereof so as to form two serrated faces on opposite sides of said handle 41. As illustrated in Fig. 1 the serrated teeth 42 interfit with the teeth on the boss 39, so that said handle may be secured against movement in any direction, and may be secured in any one of a plurality of angular positions relative to the mounting plate 30 and attached parts.

Said handle is preferably arcuate or hooked as illustrated in Fig. 6, and as it is of great advantage to be able to remount said handle with the free end extending in the opposite direction, to facilitate the gripping and holding of the machine under certain conditions, said handle may be accordingly removed and inverted and resecured by the screw 40 so that its free end portion extends in the opposite direction.

Figures 2, 3, 4, 5:
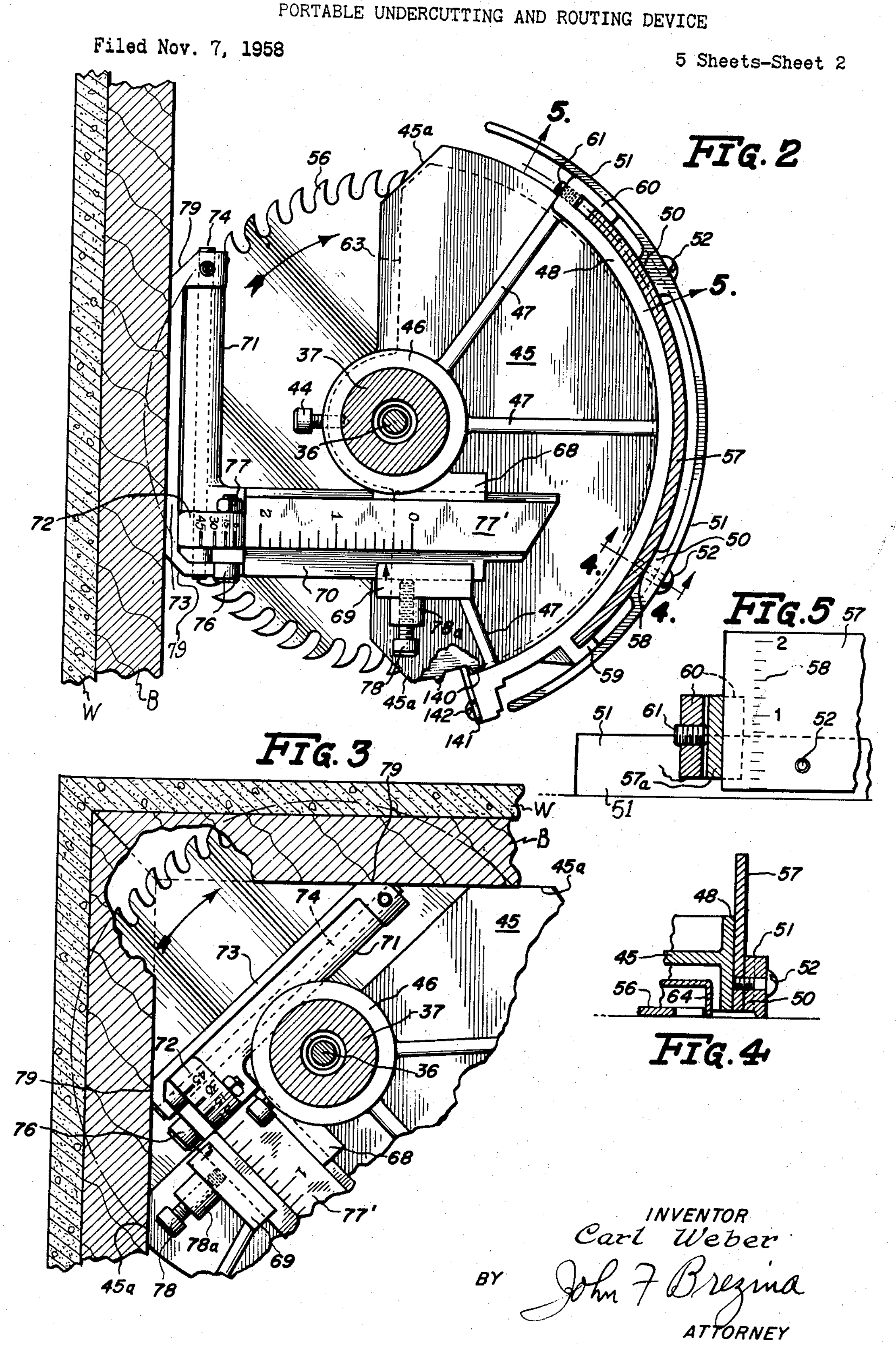
Fig. 2 is an enlarged cross section view, with parts broken away, taken substantially on a plane indicated by line 2—2 of Fig. 1.
Fig. 3 is an enlarged fragmentary view of a portion of the head and of the depth-of-cut gauge device illustrating the position of the cutting blade and of said device in relation to the right angled corner formed by angular baseboards of a typical room.
Fig. 4 is an enlarged cross section view of the adjustable guard and portion of the saw blade and taken substantially on line 4—4 of Fig. 2.
Fig. 5 is an enlarged fragmentary view taken substantially on a line indicated as 5—5 of Fig. 2.
Figures 14, 15, 16, 17:
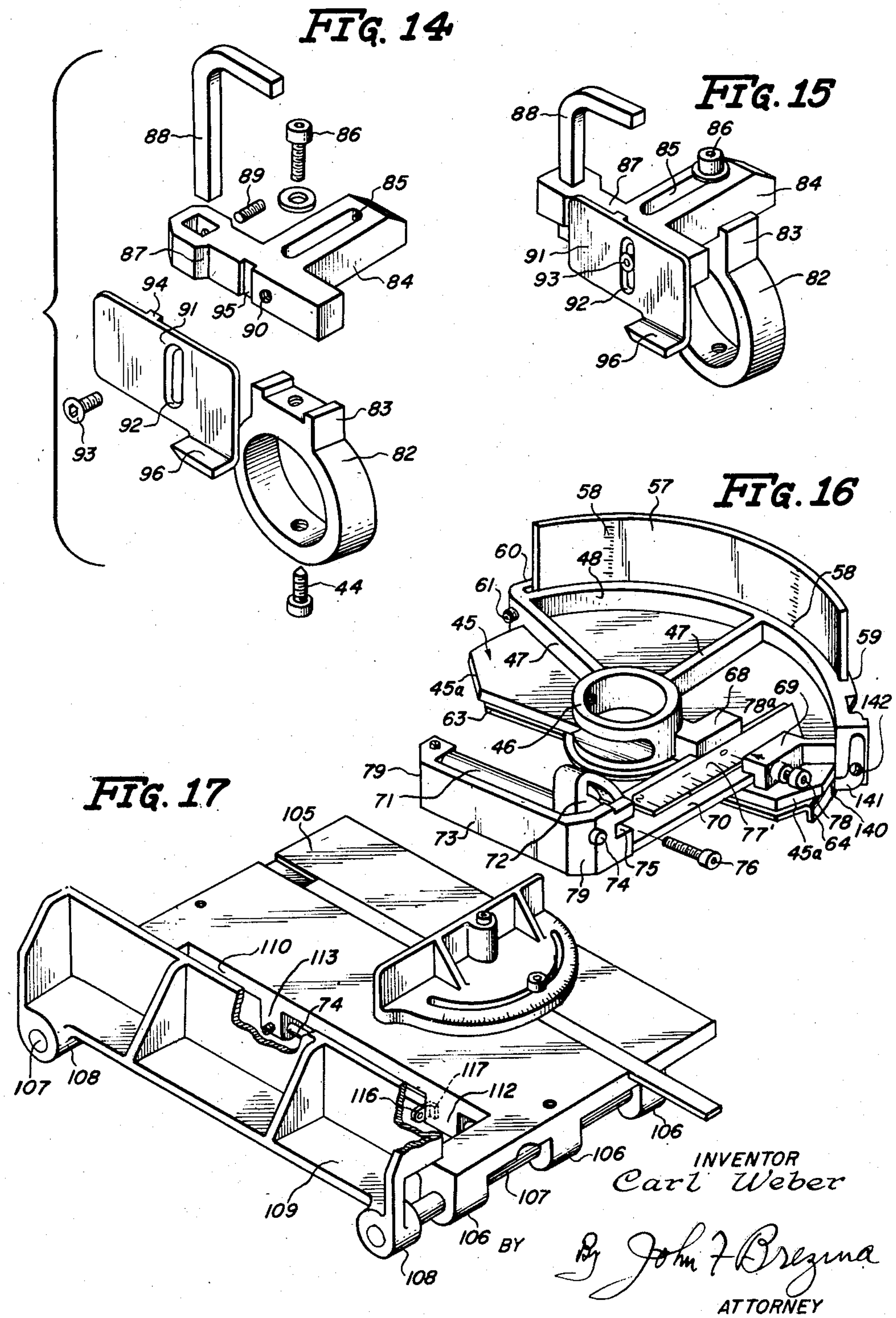
Fig. 14 is an enlarged exploded view illustrating the respective parts of the width-of-cut gauge, and the depth-of-cut shoe and depth-of-cut auxiliary gauge in the upper part.
Fig. 15 is an enlarged perspective of the width-of-cut gauge and the depth-of-cut shoe and gauge carried thereby.
Fig. 16 is a perspective view illustrating the relative position of the depth-of-cut gauge as used for undercutting in relation to the mounting frame and the adjustable gauge for control.
Fig. 17 is a perspective view of the adjustable and removable table and adjustably connected fence, said table being adjustably mounted to the mounting frame of my machine.

Removable secured on the hub 37 by means of a screw 44 is a radially extending substantially semi-circular mounting frame 45 which normally extends radially and is illustrated in plan view in Fig. 2, and partially in perspective in Fig. 16.

Said mounting frame 45 has an integral collar 46 and a plurality of radially extending reinforcing ribs 47, and an outer arcuate rim or mounting bar 48. The collar 46 has a threaded aperture in which the securing screw 44 is threadingly mounted, by means of which said mounting frame is mounted substantially in the plane perpendicular to the axis of the driven shaft which is operatively connected to the chuck 34.

Figures 11, 12:
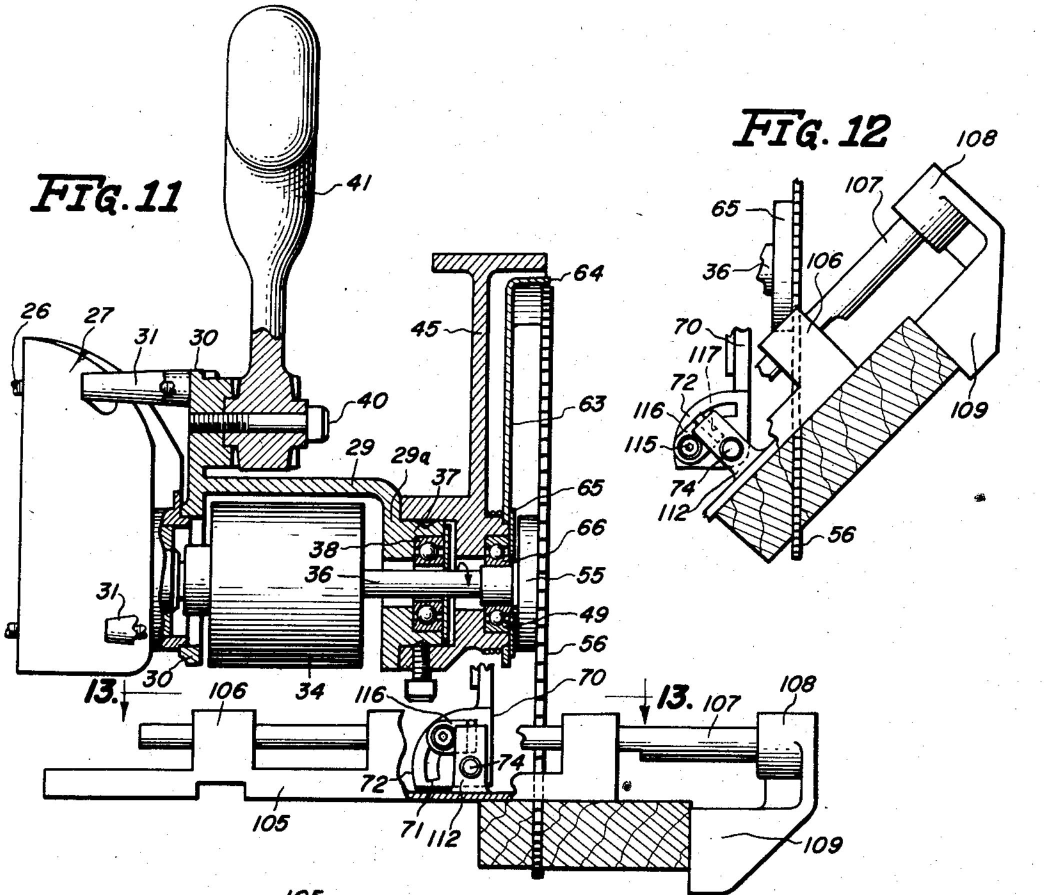
Fig. 11 is an enlarged elevational view, with parts in section and broken away, illustrating the mounting of an adjustable table and fence in relation to the driven cutting blade.
Fig. 12 is an elevational view illustrating a portion of the cutting blade and the table in adjusted position angularly with respect to a typical board.

A ball bearing 49 is mounted in the endmost flanged portion of mounting frame 45, as illustrated in Figs. 1 and 11. Said shaft or spindle 36 is journalled in said bearing 49.

It will be noted from Figs. 2 and 4 that the integral flanged mounting bar 48 extends both below and above the intermediate plate-like portion of the frame 45.

As illustrated in Figs. 1 and 11, a retainer washer 65 is secured by screws (not shown) against the annular flange of the mounting frame 45 to hold said bearing 49 in place and also to retain the pivotally mounted blade guard 63 hereinafter described.

As shown in Figs. 1, 2 and 4, an arcuate guide bar 51 having a pair of integral apertured lugs 50 extending inwardly is secured by screws 52 to guide plate 57.

Guide bar 51 is substantially longer than guide plate 57 so that its opposite ends project substantially beyond the ends of guide plate 57 and so it contacts a greater area of the floor during the sliding movement so that the device is maintained substantially in upright vertical position during operation.

In one embodiment of my invention illustrated partially in Figs. 1, 2, 3 and 11, the shaft or spindle 36 has secured thereon a plate 55 which has a plurality of threaded holes thereon (not shown), and a radially extending cutter or toothed blade 56, which has a plurality of correspondingly spaced holes formed therein, and is secured by counter sunk screws (not shown) to said plate 55, and consequently to the shaft 36.

Said guide plate 57 has two sets of calibrations 58 with indicia thereon adjacent its opposite ends and arranged vertically, one of which said calibrations 58 is illustrated in Fig. 5.

An advantageous feature of the construction is that said cutting blade has no projection or obstructions on the normally lower side thereof so that it may be positioned in operation directly adjacent the floor or other supporting surface. One of the novel means for adjustably positioning and holding the driven cutter or blade at the desired distance from a floor or supporting surface includes the adjustable arcuate guide plate 57 shown in cross section in Fig. 1, in longitudinal cross section in Fig. 2, and in perspective in Fig. 16. Said arcuate guide plate has a pair of threaded holes therein and into which said holes the two screws 52 are threaded as shown in Figs. 2 and 4.

I desire it to be understood that the normally lower arcuate edge of the arcuate guide plate 57 and guide bar 51 are adapted to be normally positioned adjacent the floor or other supporting surface during normal operation (as shown in Fig. 1) and that said guide plate 57 and bar 51 are adapted to be manually pre-set by moving the same either upwardly or downwardly to thereby change the position of their lower edges relative to the plane of the rotating cutter or blade, and to thereby provide for their maintenance, during operation of the cutting blade, at different heights from the floor or other supporting surface, such different heights of the said blade controlling the amount of baseboard or other structural member to be cut away adjacent to the floor.

An important advantage of said guide 57 and guide bar 51 being arcuate is that this will permit the operator to maintain the machine in a true vertical position and with the rotating cutter or blade in a true horizontal plane, and avoid undesirable rocking movements of the machine, this because of the relatively large area of contact between the lower contacting edges of the guide bar 51 and the floor or other supporting surface.

As illustrated in Fig. 1, 2, 5 and 11 the vertical removable guide plate 57 has one end thereof slidably seated behind the projecting portion of hook 59 shown in the lower part of Fig. 2. A rectangular thrust block 57*a* is interposed between one end of plate 57 and the inner part of hook-like lug 60. The opposite end of said guide plate 57, as shown in the upper part of Fig. 2, is slidably engaged behind the angular lug 60 which said lug has a threaded passage thereon. A set screw 61 is threaded in said passage of lug 60 and is adapted, when tightened, to bear against one side of the thrust block 57*a* and said block presses against the end of said guide plate 57 to thereby hold it in the pre-set and selected position and to the degree of downward projection desired.

The advantage of the set screw 61 and block 57*a* in pressing against the end of said guide plate is that said plate 57 will not tilt or be secured in uneven position and will always align itself in corresponding even positions over its entire length.

As illustrated in cross section in Figs. 1 and 11, and defined by a dotted line in Fig. 2, a metal blade guard 63 of substantially semi-circular shape, and having a peripheral flange 64, is journalled on a projecting annular flange and is secured by retainer washer 65, which said washer 65 is secured by screws (not shown) to the outer projecting portion of the mounting frame 45, as illustrated in Figs. 1 and 11. Said pivoted safety guard 63 is partially rotatable and adapted to be normally pressed and held in a counter-clockwise direction in relation to the rotatable cutter or blade by means of a metal spring 67 which has one coil portion thereof anchored about the annular flange hub of the mounting frame 45, as illustrated in Fig. 1. The free end of spring 67 is inserted in a hole in the guard 63, as illustrated in Fig. 1. Said spring 67 normally presses said guard 63 in position to substantially surround the teeth of the cutting blade.

As illustrated in the lower portion of Fig. 2 the pivotal swingable guard 63 has, on its peripheral angular flange 64, two spaced apart extensions or lugs 140. The enlarged end of the flange 48 on mounting frame 45 has pivoted thereon a short pawl or arm 141 by means of a screw 142. Said pawl 141 is adapted to be moved with its end portion between the two lugs 140 to thereby hold the swingable pivoted blade guard 63 in retracted non-extending position, as illustrated in dotted lines in Fig. 2. When said pawl 141 is moved to disengage said lugs 140, the spring 67 will move the pivoted blade guard into projecting positon over the major portion of the blade.

As illustrated in Fig. 16, the mounting frame 45 carries and has secured thereto a pair of opposed blocks or lugs 68 and 69 which are recessed and offset as indicated to form a channel for a leg portion of the depth-of-cut gauge herein described. A right angled metal stop member or depth-control gauge 70, illustrated in perspective in Fig. 16, has one flat leg thereof slidably and adjustably mounted between the opposed recesses of the guide blocks 68 and 69. Its outer end portion comprises a longitudinally passaged bar or metal sleeve 71 which is disposed at right angles to the said slidable leg. Said longitudinally passaged bar 71 carries an integral slotted boss 72 as illustrated in Figs. 1, 11 and 16 which has an arcuate outer face as indicated. A bail-like stop member 73 having aligned apertures in its angular integral leg portions is pivotally mounted on the bar portion 71 of gauge 70 by means of a metal pintle 74 which extends through its apertures and through the longitudinal passage in bar 71.

As shown in Fig. 16, one leg of the bail-like stop member 73 is bifurcated as at 75, and an adjusting screw 76 is normally mounted to extend through said bifurcated portion 75 and through the slot of the boss 72 and it is engaged by a suitable nut 77 as illustrate din Fig. 2. Secured on the normally upper face of the slidable leg of the gauge 70 is a suitable plate 77' which bears space graduations and numeral indicia as illustrated in Fig. 2.

As shown in Figs. 2 and 16, a manually adjustable screw 78 is threaded in an aperture in a trunnion **78*a* of the guide block 69 and its inner end releasably engages the extensible portion of the leg of gauge 70** so as to hold said gauge and the parts carried thereby in the selected and desired position in relation to the cutting blade and other parts.

It is to be understood that said adjustable depth-of-cut gauge 70 is adapted to be pre-set relative to the teeth of the blade so that the outer face of the bail-like stop member 73 will engage a vertically extending structural member whose under side is being cut by the blade and so as to limit and control the depth to which the cutting blade will cut.

As shown in Figs. 2, 12 and 16 the slidable gauge 70 carries the slotted boss 72 which has a curved outer face having graduations and indicia thereon and in which said slot is arcuate. Adjusting screw 76 normally extends through said slot as previously stated.

As illustrated in Figs. 2 and 3, the corner portions of the bail-like stop member 73 are beveled at an angle of 45 degrees relative to the forward outer flat face of said bail-like stop member, as indicated at 79. When two separate baseboards, that meet at right angles in a corner, are to be undercut for the purpose of easily inserting one or another form of floor covering, it is essential that the rotating cutting blade shall cut substantially deeper in a horizontal plane into the lower edge portions of the baseboards forming said corner. In these instances, the right angled stop member 70 is released by loosening screw 78 (see Figs. 2 and 16) and pushed inwardly to its most inward position such as illustrated in Fig. 3, and the screw 78 is again tightened. Thereupon the operator, while holding the machine in proper vertical position with the aid of the arcuate guide 57, will position and feed the rotating saw blade horizontally into said corner until the beveled faces 79 of the stop gauge 70 will contact both of the baseboards in the manner illustrated in Fig. 3, in which position the rotating cutter blade will have made its undercut of sufficient depth in both baseboards to provide for adequate insertion under said baseboards of floor covering units of whatever type are being used (see Fig. 3).

When the last mentioned inserted cutting portion of the blade has been attained wherein the beveled faces 79 of stop gauge 70 contact the faces of the baseboards of a corner, the beveled corner portions **45*a* of mounting frame 45 will be in alignment with the beveled corner portions 79 respectively of the stop gauge 70 and these will simultaneously contact the two exposed faces of the angular baseboards which form the corner of the room, as illustrated in Fig. 3. Such contacting engagement of corner portions 45*a*** also acts to stop further cutting movement of the baseboards.

In undercutting right angled baseboard corners, the user may optionally first remove the depth-of-cut gauge 70 entirely, as the beveled corner portions **45*a*** will contact the normally vertical faces of the baseboards to properly limit the depth of cutting.

In Figs. 7, 8, 9, 10, 14 and 15 I have illustrated my invention having a modified form of cutting and routing means mounted to be driven through the aforesaid driven chuck, and in which modified form a plurality of radially extending cutters or toothed elements are mounted on the spindle or shaft instead of a single cutting blade. Said modified forms of my invention are adapted for cutting away and removing various hard material such as putty from various structural units such as window sash and frames and other structural members, and where deisred, to cut away portions of wood and fibrous material.

In the last mentioned modified form of the invention illustrated in Figs. 7 to 10, a relatively shorter stub shaft 80, having an inner reduced end portion, is journaled in the ball bearing 38 and its inner end is secured in the driven chuck 34 by means of the set screw 35 said shaft being mounted in place of the previously described shaft 36.

The outer end portion of shaft 80 is suitably threaded (not shown), and a plurality of threaded radially extending cutters or cutter blades 81 having relatively pointed sharp radial teeth, as illustrated in Fig. 8, are threadingly mounted on said shaft 80.

In this modified form, the mounting frame 45 illustrated in Figs. 1 and 11 has been removed, and a mounting collar 82 is secured about the integral hub of the mounting and journaling member 29 by means of the said screw 44. Said collar 82 has an integral recessed extension or boss 82 which has a threaded hole in it as illustrated in Fig. 14. A T-shaped mounting bracket 84 having a slot 85 is adjustably and slidably mounted in the recesses of the boss 83 by means of a headed screw 86, as illustrated in Fig. 15. Said bracket 84 has an integral transversely extending bifurcated extension 87 providing a yoke, as indicated in Figs. 14 and 15, for the adjustable mounting of an auxiliary angular depth-of-cut guide or gauge 88 which is of substantially, right angled shape as illustrated in Figs. 14 and 15.

A screw 89, illustrated in Fig. 14 is threaded into a threaded passage in the bifurcated end portion of the extension 87 and is adapted to bear against the leg of the depth-of-cut gauge 88. The operation and use of the said auxiliary depth-of-cut gauge will be later described.

As illustrated in Fig. 14, the metal portion of the bracket 84 has a threaded hole 90 opening in its forward face. A flat faced guide plate comprising a width-of-cut gauge 91 has a transversely extending slot 92 formed therein, as illustrated in Figs. 14 and 15. A headed screw 93 is adjustably mounted to extend through slot 92 and threads into the hole 90 of bracket 84 so as to adjustably mount said depth-of-cut gauge 91 for selective varied positioning perpendicular to the central plane of the bracket 84. Said depth-of-cut gauge 91 has an integral guide lug 94 on its inner side which extends transversely of said plate, and is adapted to slidably engage slot 95 formed in the forward face of the bracket 84, as illustrated in Fig. 14.

Formed on one end portion of the width-of-cut guide plate and gauge 91 is an integral perpendicular extension and shoe 96 which comprises a depth-of-cut gauge, and which slidably engages the rabbet or grooved face of a sash rail from which the hard putty or mastic is cut away by the cutters as hereinafter described, so that said shoe 96 limits the depth to which the points of the radially extending cutters can be moved.

As illustrated in Figs. 7 to 10 inclusive, the bracket 84 is adapted to be pre-set to adjusted position and secured by screw 86 so as to cause the end face of gauge 91 to slide on the face of a sash rail 100, such pre-setting being so that the outermost of the radial cutters 81 will be positioned substantially adjacent glass pane 101, as illustrated in Fig. 7, or so that said end-most cutter 81 will be adjacent the ridge or flange 102, as illustrated in Fig. 9.

At the time of the pre-setting operation, the screw 93 will be loosened and the width-of-cut gauge plate 91 will be pre-set and secured by said screw so that the shoe 96 will be secured in a position to slide along the rabbeted face of the sash rail to prevent movement of the machine and of the cutter 81 into the sash rail itself; in other words, only up to the face of the sash rail so as to prevent damage to or cutting away of any part of the sash rail, as illustrated in Figs. 7 and 8.

It is to be understood that while I have illustrated in Figs. 7, 8 and 9 the position of said driven shaft and its cutter as engaging the downward face of an upper sash rail, the same relative positioning is accomplished with respect to the grooved vertical edges of the left and right side rails of a sash and with respect to the normally lower rail of the sash. Similarly, in instances where the sash or frame are removed and supported in horizontally extending position the operator will position the machine during operation so that the longitudinal axis of the shaft is perpendicular to the plane of the sash or to the plane of the glass pane where the latter is mounted in.

The auxiliary depth-of-cut bracket-like gauge 88 is employed in any one of several ways, for example, as in Figs. 7 and 8 wherein the position of said auxiliary gauge 88 is preset so that its foot or shoe portion will slidably engage the faces of adjacent structural members of the frame, one of which members is designated by numeral 103 in Figs. 7 and 8. It is to be understood that as the operator moves the machine in successive strokes along the putty line and with the cutter 81 cutting away the putty line, the foot portion of auxiliary gauge 88 will thereby limit the depth to which the cutters 81 can cut, due to the sliding engagement of said foot with adjacent window frame members.

Another manner in which the auxiliary depth gauge 88 is employed for limiting the depth of cutting is illustrated in Fig. 10 in which the gauge 88 is inverted in the opposite direction and secured by the screw 89 in a position wherein its angularly bent foot portion will contact and slide on the sash rail when the depth of cutting has reached the desired degree for the purpose of removing the hard material from the groove. Similarly the depth of cutting can be limited by said auxiliary gauge 88 with respect to the beveled ridge of a window sash where the glass pane has been removed from it. In Fig. 10 I have illustrated employment only of two said cutters 81 which are adapted to remove the hardened material from the usual relatively narrow groove in the upper rails of double hung sashes.

The afore-described adjustable positioning of the angular handle 41 is especially advantageous when removing material from sash rails by means of cutters 81 as has been described due to the substantial projections of window frames adjacent to window openings and which restrict the space in which the machine can be manually moved in successive strokes relative to sash frames or the like, it being understood that said handle can be quickly and easily inverted when working on one side or the other of the window frame and wherein the maximum freedom for movement will be provided.

*Description of operation of said machine with adjustable table*

Figure 13:
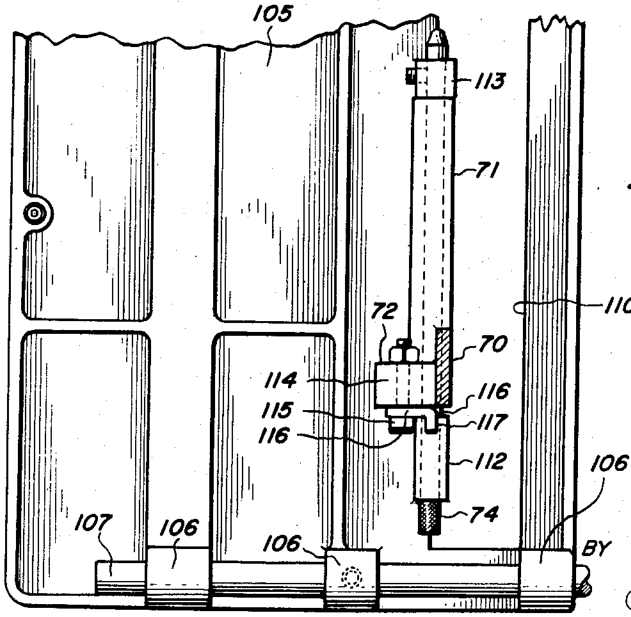
Fig. 13 is a fragmentary elevation of the adjusted table and taken substantially on line 13—13 of Fig. 11.

As illustrated in Figs. 11, 12, 13 and 17, numeral 105 designates a portable substantially rectangular adjustable table which has a substantially upper flat face and has a plurality of spaced apart integral passaged ears, lugs or knuckles 106 which normally extend from the under side thereof as illustrated in Figs. 11, 12, 13, and 17. Three of said knuckles are shown in Figs. 13 and 17. The opposite end of said table has 3 of said knuckles 106.

Mounted in the two sets of longitudinally aligned passages of said knuckles 106 are a pair of parallel rods 107 which are slidably mounted therein as shown. The outer ends of said rods 107 are mounted in the apertured ears 108 of an adjustable elongated metal fence 109, which is illustrated in perspective in Fig. 17. Rods 107 provide for longitudinal movement thereof and relative varying positioning of the fence. Said fence 109 is of right angled transverse cross section and one portion thereof is normally perpendicular to the upper face of the table 105.

Said table is provided with a longitudinally extending slot 110 through which the cutters or cutting blade are adapted to extend, as illustrated in Figs. 11, 12 and 17.

The mounting means for adjustably mounting the said table 105 comprises the following. As shown in Fig. 13, table 105 has preferably formed integral therewith, a pair of spaced apart passaged anchoring lugs 112 and 113 as illustrated in the under side view of Fig. 13. The pintle 74, which has been removed from the position illustrated in Fig. 2 and after the bail 73 is removed, is inserted through the aligned passages in lugs 112, 113 and through the elongated knuckle-like bar portion 71. This pivotably and adjustably mounts the table with respect to said bar portion 71 of the stop gauge 70.

In Fig. 11, the saw table 105 is shown, with certain parts broken away, as in inverted position with the work engaging face downward. To mount said table 105, the pintle 74 is removed and the bail-like stop member 73 is removed. The work table 105 having on its underside two spaced apart passaged knuckles 112 and 113, and these are aligned with the passaged leg 71 of stop member or gauge 70, and the pintle 74 inserted through the aligned holes in said knuckles, as stated and as illustrated in Fig. 13. This mounts the table pivotally with respect to the leg portion 71 of depth-of-cut gauge 70.

As shown in Fig. 13 a passaged slotted boss 72 is formed integral with the leg portion of the gauge 70 and said lug externally extends outwardly from the under face of the mounted table 105. In the arcuate slot of boss 72 is mounted a pivoting bolt 115, as shown in Fig. 13. A pawl or dog 116 is pivoted on bolt 115 and it has an integral extension which releasably seats in a recess 117 formed in the end of knuckle 112.

Said integral extension, when seated in said recess 117 prevents tilting or pivotal movement of said table in a plane perpendicular to the plane of the cutting blade, When it is desired to mount the table in angular or tilted position, such as illustrated in Fig. 12, the bolt 116 is loosened by releasing its nut and the bolt is slipped in the arcuate slot of the slotted boss 72 until the desired angular position of the table is attained, whereupon the bolt 116 is tightened to thereby hold the table in the desired varied angular position to attain the desired angular cuts, as illustrated in Fig. 12.

It will be understood that the construction described, particularly with reference to the removable mounting means of the undercutting saw and its shaft such as illustrated in the drawings, provides for quick and easy removability of the said saw and its shaft and a quick and easy replacement mounting of a similar shaft having a plurality of relatively shorter radially extending cutters thereon such as illustrated in Figs. 7 to 10, the last mentioned shorter cutters being adapted for cutting and routing hard materials such as hard putty or the like.

My said cutting and routing device greatly reduces the labor and required time to cut away and remove putty and other hard material and to undercut and remove parts of baseboards and walls wherever such cutting away and removal is desirable.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A portable cutting machine adapted for undercutting or the like; an elongated housing having a handle; an electric motor in said housing; a controlling switch for said electric motor; a chuck operatively connected to the shaft of said electric motor; an offset mounting member connected to said housing; an auxiliary handle adjustably connected to said off-set mounting member; a journalling frame removably mounted on the outer end portion of said offset mounting member; a spindle journalled in said journalling frame; a cutting blade mounted on the outer end of said spindle; an angular stop and depth limit gauge adjustably connected to said journalling frame; and means for releasably and adjustably holding said stop gauge in relation to said journalling frame and said blade, said stop gauge being adapted to control the depth of cutting of said blade.

2. A portable machine for cutting material substantially as described in claim 1 and wherein said adjustable depth-of-cut gauge has a pivotally mounted bail-like stop member adjustably mounted thereon to provide for varying its relative angular positions.

3. A cutting machine adapted for cutting adjacent to floors and other obstructions substantially as described in claim 1, and having a guide plate adjustably mounted on the outer portion of said journalling frame and for guiding and maintaining said blade at varying distances from the floor or other supporting structural member.

4. A portable machine for cutting structural members adjacent floors or other obstructions and for removing parts of structural members substantially as described in claim 1, and having a guide plate adjustably mounted on the outer portion of said journalling frame for guiding said blade in paths at varying distances from a floor, and having manually adjustable means mounted at the outer portion of said journalling frame member for releasably holding said guide plate in a desired position relative to said frame and said blade, said depth-of-cut limiting gauge having its opposite ends outwardly beveled, said beveled ends being adapted to engage the faces of angularly mounted structural members when said blade has cut into the corners of said structural members to the desired degree.

5. In a portable machine for cutting away from structural members relatively hard material such as putty or the like, an elongated housing; an electric motor in said housing; a control switch for said motor; a chuck operatively connected to be driven by said motor; a mounting bracket connected at spaced apart points to said housing and having a projecting offset portion; a shaft journalled in the offset portion of said bracket and removably connected to said chuck; a plurality of cutters having radially extending teeth on the outer portion of said shaft; a slotted mounting bracket adjustably mounted on the projecting portion of said first mentioned mounting bracket and adapted for adjusting movement parallel to the longitudinal axis of said shaft; a width-of-cut gauge on said slotted bracket and adapted to slidably engage a sash rail or the like; a shoe plate mounted on said width-of-cut gauge for adjustable movement in a direction perpendicular to the axis of said shaft, said shoe plate being adapted to engage the face of a sash rail to limit the depth of cutting of said cutter, said shoe plate being adapted to slide on the portions of the sash rail from which material has been removed; and an auxiliary angularly bent handle adjustably connected to said mounting bracket and adapted to facilitate manual movement of said machine relative to sash or other structural members.

6. In a portable machine for cutting away from structural members relatively hard material such as putty or the like, an elongated housing; an electric motor in said housing; a control switch for said motor; a chuck operatively connected to be driven by said motor; a mounting bracket connected at spaced apart points to said housing and having a projecting offset portion; a shaft journalled in the offset portion of said bracket and removably connected to said chuck; a plurality of cutters having radially extending teeth on outer portion of said shaft; a slotted mounting bracket adjustably mounted on the projecting portion of said first mentioned mounting bracket and adapted for adjusting movement parallel to the longitudinal axis of said shaft; a width-of-cut gauge on one end of said slotted bracket and adapted to slidably engage a sash rail or the like; and a depth-of-cut gauge comprising a transversely slotted plate and an integral angularly extending contact shoe thereon, said contact shoe being adapted to slidably engage the grooved face of a structural rail or the like, said depth-of-cut gauge being adapted to slide on the portions of the sash rail from which material has been removed; and an auxiliary angularly bent handle adjustably connected to said mounting bracket and adapted to facilitate manual movement of said machine relative to sash or other structural members.

7. In a portable machine for cutting away from structural members relatively hard material such as putty or the like, an elongated housing; an electric motor in said housing; a control switch for said motor; a chuck operatively connected to be driven by said motor; a mounting bracket connected at spaced apart points to said housing and having a projecting offset portion; a shaft journalled in the offset portion of said bracket and removably connected to said chuck; a plurality of cutters having radially extending teeth on outer portion of said shaft; a slotted mounting bracket adjustably mounted on the projecting portion of said first mentioned mounting bracket and adapted for adjusting movement parallel to the longitudinal axis of said shaft; a width-of-cut gauge on one end of said slotted bracket and adapted to slidably engage a sash rail or the like; and a depth-of-cut gauge comprising a transversely slotted plate and an integral angularly extending contact shoe thereon, said contact shoe being adapted to slidably engage the grooved face of a structural rail or the like, said depth of cut gauge being adapted to slide on the portions of the sash rail from which material have been removed; an auxiliary angularly bent handle adjustably connected to said mounting bracket and adapted to facilitate manual movement of said machine relative to sash or other structural members; an auxiliary angularly extending depth gauge adjustably mounted on the outer portion of said bracket and adapted to be adjustably positioned in positions substantially parallel to the plane of said driven cutters; said auxiliary depth gauge being adapted to slidably engage a rigid structural member to limit the depth of cutting of said cutters.

8. A portable device for cutting and for removing hard material from structural members; a housing; an electric motor in said housing; a control switch on said housing for said motor; a chuck operatively connected to said electric motor; a transverse mounting plate secured to the end of said housing; an angular mounting member carried by said mounting plate and extending beyond said chuck; an auxiliary handle adjustably connected to said mounting plate and extending radially; a substantially semi-circular mounting frame having a hub portion removably secured on the projecting portion of said angular mounting member; a spindle journalled in said mounting frame and connected to said chuck; a cutting blade having radially extending teeth mounted on the outer end portion of said spindle; an arcuate guide plate adjustably secured on the outer portion of said mounting frame and adjustable in a direction perpendicular to the plane of said blade; and an angular stop and depth gauge having one portion adjustably mounted on said mounting frame and having its outer portion positionable at varying distances from the axis of said shaft and adapted to limit the depth of cutting of said blade.

9. A portable device for cutting and for removing hard material from structural members; a housing; an electric motor in said housing; a control switch on said housing for said motor; a chuck operatively connected to said electric motor; a transverse mounting plate secured to the end of said housing; an angular mounting member carried by said mounting plate and extending beyond said chuck; an auxiliary handle adjustably connected to said mounting plate and extending radially; a substantially semi-circular mounting frame having a hub portion removably secured on the projecting portion of said angular mounting member; a spindle journalled in said mounting frame and connected to said chuck; a cutting blade having radially extending teeth mounted on the outer end portion of said spindle; an arcuate guide plate adjustably secured on the outer portion of said mounting frame and adjustable in a direction perpendicular to the plane of said blade; an angular stop and depth gauge having one portion adjustably mounted on said mounting frame and having its outer portion positionable at varying distances from the axis of said shaft and adapted to limit the depth of cutting of said blade, and manually adjustable means for releasably securing said stop and depth gauge in varying positions to control the desired depth of cutting.

10. A portable device for cutting and for removing hard material from structural members; a housing; an electric motor in said housing; a control switch on said housing for said motor; a chuck operatively connected to said electric motor; a transverse mounting plate secured to the end of said housing; an angular mounting member carried by said mounting plate and extending beyond said chuck; an auxiliary handle adjustably connected to said mounting plate and extending radially; a substantially semi-circular mounting frame having a hub portion removably secured on the projecting portion of said angular mounting member; a spindle journalled in said mounting frame and connected to said chuck; a cutting blade having radially extending teeth mounted on the outer end portion of said spindle; an arcuate guide plate adjustably secured on the outer portion of said mounting frame and adjustable in a direction perpendicular to the plane of said blade; an angular depth gauge having one leg portion adjustably mounted on said mounting frame and having an outer bail-like portion pivotally connected and positionable at varying distances from the axis of said shaft and adapted to limit the depth of cutting of said blade, and manually adjustable means for pre-setting the position of said bail-like portion relative to said leg portion of said depth gauge.

11. A portable cutting device adapted for undercutting structural members adjacent floors or the like, comprising an electric motor, a driven shaft, means for journalling said shaft, a toothed cutting element on the end of said shaft; a mounting frame; a guide plate adjustably mounted with respect to said frame and movable in a direction parallel to the axis of said shaft, said guide plate being adapted to slidably engage a floor or the like to maintain said cutting element at the desired distance from said floor; an angular gauge slidably and adjustably mounted on said frame and having an elongated passaged cylindrical portion; a slotted boss carried by said cylindrical portion of said gauge; an adjustable table pivotally and adjustably connected to said cylindrical portion of said gauge; and adjustable means connected to said table for releasably holding said table in varying angular positions relative to the plane of said cutting element, whereby said cutting element may be guided in varying angular paths during cutting movements.

12. An adjustable portable device for cutting materials at varying angles and for undercutting structural members adjacent obstructions substantially as described in claim 11, and having a movable adjustable fence adjacent one edge of said table and slidable bars mounted in the end portions of said table adapted to provide for selective positioning of said fence relative to the said cutting element to thereby control the path of cutting with respect to structural members to be cut.

13. A portable device for cutting and routing material; comprising a mounting frame; a power driven spindle; a cutting blade having radially extending teeth thereon connected to said spindle; an angular gauge-like holding member adjustably mounted on said mounting frame; and having a projecting passaged portion; a table having a plurality of passaged lugs thereon; a pintle for releasably and adjustably mounting said lugs of said table with respect to said passaged portion of said holding member to thereby adjustably and removably mount said table; manually adjustable means on said holding member for holding said table in the desired angular position; said table providing for guiding said cutting blade at the desired angle relative to said blade and providing for guiding a movable work piece to be cut along the face of said table.

14. A portable device for cutting materials substantially as recited in claim 13 and having a movable fence adjacent one edge of said table, and means engaging on said table for slidably mounting said fence for movement toward and away from said cutting blade; said device being supportable in a portable closable container in positions to hold said table and said fence above the side walls of said container.

15. A portable device adapted for removing hard putty and cementitious materials from grooves of sash or the like; a mounting frame; a shaft adapted to be releasably mounted in a driven chuck; a plurality of cutters mounted on the end of said shaft in planes angular to the axis of said shaft; an outwardly extending handle adapted to be releasably connected to said frame; a lever fulcrumed in said handle and having projecting studs on the normally inner end thereof; a recessed metal mounting head connected to said frame portion of said shaft, said mounting head having a recess opening on one face thereof; said studs being adapted to seat in said recesses; a width-of-cut gauge adjustably mounted in the recess of said head and adapted to engage a structural member to control the width of cutting of said cutters; an adjustable depth-of-cut gauge carried by said width gauge; means for adjusting the position of said depth-of-cut gauge perpendicularly relative to the axis of said shaft; said handle being selectively positionable in varying positions to provide for positioning said gauges to the left or to the right and at different angular positions relative to said handle, said depth gauge being adapted to slidably engage the inner face of a sash rail to limit the inward cutting of said cutters.

16. A device for cutting and removing putty or the like from sash rails or the like substantially as described in claim 15 and having a second angular depth-of-cut gauge adjustably mounted on one end portion of said width-of-cut gauge, said second depth-of-cut gauge being adapted to slidably engage the face of the inner ridge of a sash rail or the like.

References Cited in the file of this patent

UNITED STATES PATENTS

| | | |
|---|---|---|
| 1,780,174 | Crowe | Nov. 4, 1930 |
| 1,803,068 | McKeage | Apr. 28, 1931 |
| 2,610,658 | Koeling | Sept. 16, 1952 |
| 2,630,151 | Turnbull | Mar. 3, 1953 |
| 2,635,655 | Linstead | Apr. 21, 1953 |
| 2,741,282 | Wieting | Apr. 10, 1956 |
| 2,785,716 | Lutton | Mar. 19, 1957 |
| 2,878,842 | Pickersgill | Mar. 24, 1959 |

FOREIGN PATENTS

| | | |
|---|---|---|
| 712,071 | Great Britain | July 14, 1954 |